(12) United States Patent
Fukumoto (10) Patent No.: US 8,030,850 B2
(45) Date of Patent: Oct. 4, 2011

(54) FLUORESCENT LAMP DRIVING APPARATUS WITH ABNORMALITY DETECTION CIRCUIT

(75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 927 days.

(21) Appl. No.: 11/915,993

(22) PCT Filed: May 30, 2006

(86) PCT No.: PCT/JP2006/310729
§ 371 (c)(1),
(2), (4) Date: Nov. 29, 2007

(87) PCT Pub. No.: WO2006/129636
PCT Pub. Date: Dec. 7, 2006

(65) Prior Publication Data
US 2010/0020269 A1  Jan. 28, 2010

(30) Foreign Application Priority Data

Jun. 2, 2005  (JP) ................................ 2005-162520

(51) Int. Cl.
*H05B 37/00* (2006.01)
(52) U.S. Cl. ........ 315/119; 315/308; 315/307; 315/277; 315/291; 315/224
(58) Field of Classification Search ............... 315/119, 315/128, 225, 254–257, 308, 312, DIG. 5, 315/291, 307, 224, 274, 276, 277; 345/102; 362/97.1, 97.2
See application file for complete search history.

(56) References Cited

U.S. PATENT DOCUMENTS 5,325,024 A * 6/1994 Piejak et al. ................. 315/254
(Continued)

FOREIGN PATENT DOCUMENTS

CN  1737648 A  2/2006
(Continued)

OTHER PUBLICATIONS

International Preliminary Report on Patentability for International Application No. PCT/JP2006/310729 mailed Dec. 24, 2007.

(Continued)

*Primary Examiner* — Jacob Y Choi
*Assistant Examiner* — Ephrem Alemu
(74) *Attorney, Agent, or Firm* — Cantor Colburn LLP (57) ABSTRACT

In an apparatus for driving a CCFL, a first inverter outputs a first alternating current (AC) voltage to one end of the CCFL. A second inverter outputs a second AC voltage having a reversed phase to the first AC voltage to the other end of the CCFL. A first current-voltage converting circuit converts a secondary current of a first transformer in the first inverter to a voltage and outputs the voltage as a first detection voltage. A second current-voltage converting circuit converts a secondary current of a second transformer in the second inverter to a voltage and outputs the voltage as a second detection voltage. A first abnormality detection circuit determines a circuit abnormality when the potential difference between the first and second detection voltages exceeds a predetermined first threshold voltage.

24 Claims, 5 Drawing Sheets

U.S. PATENT DOCUMENTS

| | | | |
|---|---|---|---|
| 6,087,776 A * | 7/2000 | Yamashita et al. | 315/82 |
| 7,126,289 B2 * | 10/2006 | Lin et al. | 315/308 |
| 7,309,964 B2 * | 12/2007 | Wey et al. | 315/312 |
| 7,372,214 B2 * | 5/2008 | Song et al. | 315/291 |
| 2006/0120109 A1 * | 6/2006 | Inoue et al. | 362/614 |
| 2006/0170371 A1 * | 8/2006 | Lyle et al. | 315/209 R |

FOREIGN PATENT DOCUMENTS

| | | |
|---|---|---|
| JP | 1-167986 | 7/1989 |
| JP | 1-167986 A | 7/1989 |
| JP | 4-163892 | 6/1992 |
| JP | 4-163892 A | 6/1992 |
| JP | 4-331474 | 11/1992 |
| JP | 4-331474 A | 11/1992 |
| JP | 2003-323994 | 11/2003 |
| WO | 2004-017508 A1 | 2/2004 |
| WO | 2004/017508 A1 | 2/2004 |

OTHER PUBLICATIONS

International Search Report for International Application No. PCT/JP2006/310729 mailed Jul. 4, 2006.
Japanese Office Action for Japanese Application No. 2005-162520 dispatched Dec. 21, 2010 with English translation.
Chinese Office Action for Chinese Application No. 200680018285.5 issued Jan. 10, 2011 with English traslation.

* cited by examiner

| PROBE | COND1<br>NORMAL<br>LIGHTING | COND2<br>FIRST END:<br>OPEN | COND3<br>BOTH ENDS:<br>OPEN | COND4<br>NORMAL<br>LIGHTING<br>WITH<br>FIRST END | COND5<br>FIRST END:<br>OPEN<br>WITH<br>FIRST END | COND6<br>BOTH ENDS:<br>OPEN<br>WITH<br>FIRST END |
|---|---|---|---|---|---|---|
| | NONE | NONE | NONE | | | |
| Vdet1 | 0.9V | 0.3V | 0.3V | 1.0V | 0.6V | 0.7V |
| Vdet2 | 0.9V | 1.5V | 0.3V | 0.8V | 1.2V | 0.3V |
| ΔV | 0V | 1.2V | 0V | 0.2V | 0.6V | 0.4V |

US 8,030,850 B2

FLUORESCENT LAMP DRIVING APPARATUS WITH ABNORMALITY DETECTION CIRCUIT

CROSS REFERENCE TO RELATED APPLICATIONS

This is a U.S. national stage of application No. PCT/JP2006/310729, filed on 30 May 2006. Priority under 35 U.S.C. §119(a) and 35 U.S.C. §365(b) is claimed from Japanese Application No. 2005-162520, filed 2 Jun. 2005, the disclosure of which is also incorporated herein by reference.

BACKGROUND OF THE INVENTION

1. Field of the Invention

The present invention relates to a fluorescent lamp driving apparatus and, more particularly, to a circuit protection technique for the apparatus.

2. Description of the Related Art

In recent years, a thinner and larger-sized liquid crystal television have been widely provided in place of a CRT television. In a liquid crystal television, a plurality of cold cathode fluorescent lamps (hereinbelow, called CCFLs) are disposed in the back surface of a liquid crystal panel on which a video image is displayed, and the CCFLs are allowed to emit light as a backlight.

To drive the CCFLs, for example, an inverter (DC/AC converter) for boosting a direct current (DC) voltage of about 12V and outputting the resultant voltage as an alternating current (AC) voltage is used. The inverter converts an electric current flowing in the CCFLs to a voltage, feeds back the voltage to a control circuit and, on the basis of the feedback voltage, controls the on/off state of a switching device. For example, Patent Document 1 discloses a technique of driving a CCFL by such an inverter.

[Patent Document] Japanese Patent Application Laid-open No. 2003-323994

To suppress increase in the number of CCFLs accompanying enlargement of the size of the liquid crystal panel, a U-shaped CCFL is employed. To drive the U-shaped CCFL, it is necessary to use two inverters to apply AC voltages of reversed phases across the U-shaped CCFL. Such a U-shaped CCFL drive circuit converts secondary current of transformers of two inverters to voltage, feeds back the voltage and, on the basis of the feedback voltage, controls light emission of the CCFL.

Such a drive circuit is provided with an abnormality detection circuit for detecting an abnormal state in which a CCFL fails or connection failure occurs and, as necessary, performing circuit protection. For example, the abnormality detection circuit monitors the feedback voltage, determines a circuit abnormality when the feedback voltage becomes below a predetermined threshold voltage, and performs circuit protection.

The manufacturer of a liquid crystal television conducts a test for detecting a failure in a U-shaped CCFL, a contact failure, or the like before shipment of a television. In the test, in some cases, the user wishes to conduct a test to see whether a predetermined high voltage is applied across the U-shaped CCFL or not in a state where the U-shaped CCFL emits light. There is also a case that a similar test is desired to be conducted at the time of failure maintenance also after shipment.

Since a high voltage exceeding 1,000V is applied to the U-shaped CCFL, a high-voltage probe is used for testing the voltage. The high-voltage probe has large capacity. Consequently, in the case of testing each of the ends of the CCFL, the feedback voltage also fluctuates. Therefore, in the case of determining whether the CCFL is normally driven or not on the basis of the voltage fed back to a control circuit, it is difficult to determine whether the feedback voltage fluctuates due to a failure or by the high-voltage probe.

SUMMARY OF THE INVENTION

The present invention has been achieved in view of such problems, and a general purpose of the invention is to provide a fluorescent lamp driving circuit capable of detecting a circuit abnormality in various states.

An embodiment of the present invention relates to a fluorescent lamp driving apparatus. The driving apparatus includes: a first inverter which outputs a first alternating current (AC) voltage to one end of a fluorescent lamp; a second inverter which outputs a second AC voltage having a reversed phase to the first AC voltage to the other end of the fluorescent lamp; a first current-voltage converting circuit which converts a secondary current of a transformer in the first inverter to a voltage and outputs the voltage as a first detection voltage; a second current-voltage converting circuit which converts a secondary current of a transformer in the second inverter to a voltage and outputs the voltage as a second detection voltage; and a first abnormality detection circuit which determines a circuit abnormality when the potential difference between the first and second detection voltages exceeds a predetermined threshold voltage.

In the embodiment, during normal turn-on, the first and second detection voltages are almost equal to each other. On the other hand, when one of the ends of the fluorescent lamp is open, the potential difference between the first and second detection voltages is large. Consequently, irrespective of the presence or absence of the high voltage probe, a circuit abnormality can be detected.

The first abnormality detection circuit may include: a first level shift circuit which shifts level of the first detection voltage by the threshold voltage; a second level shift circuit which shifts level of the second detection voltage by the threshold voltage; a first comparator which compares the second detection voltage with output voltage of the first level shift circuit; a second comparator which compares the first detection voltage with output voltage of the second level shift circuit; and an OR gate which outputs OR of outputs of the first and second comparators, and determine a circuit abnormality on the basis of the output of the OR gate.

The first abnormality detection circuit can detect a state where the second detection voltage is higher than the first detection voltage by the threshold voltage or more by the first comparator, and detect a state where the first detection voltage is higher than the second detection voltage by the threshold voltage or more by the second comparator.

Each of the first and second level shift circuits may include: a voltage follower circuit to which the first detection voltage or the second detection voltage is input; a resistor whose one end is connected to an output terminal of the voltage follower circuit; and a constant current source which passes constant current to the resistor, and output the level-shifted voltage from a connection point between the resistor and the constant current source.

In this case, each of the first and second level shifters can shift the level of the first and second detection voltage by a voltage drop in the first or second resistor.

Each of the first and second current-voltage converting circuits may include: a half-wave rectifier circuit which rectifies the secondary current of the transformer; and a filter which smoothes an output of the half-wave rectifier circuit, and output an output voltage of the filter as the first or second detection voltage to the comparator.

A second abnormality detection circuit may include: a third comparator which compares the first detection voltage with the second threshold voltage; a fourth comparator which compares the second detection voltage with the second threshold voltage; and an OR gate which outputs OR of outputs of the third and fourth comparators.

The driving apparatus may further include a second abnormality detection circuit which determines a circuit abnormality when at least one of the first and second detection voltages is lower than a predetermined second threshold voltage.

When an abnormality occurs in both ends of a fluorescent lamp, the first and second detection voltages become almost the same, so that the circuit abnormality may not be detected by the first abnormality detection circuit. When an abnormality occurs in both ends of a fluorescent lamp, both of the first and second detection voltages become low voltages. Consequently, by comparing the detection voltages with the second threshold voltage, also in the case where an abnormality occurs in both ends, the circuit abnormality can be detected.

The fluorescent lamp may be a cold-cathode fluorescent lamp. Further, the cold-cathode fluorescent lamp may have a U shape.

Another embodiment of the present invention relates to a light emitting apparatus. The light emitting apparatus includes: the above-described driving apparatus; and a U-shaped fluorescent lamp across which the first and second AC voltages output from the first and second inverters of the driving apparatus are applied.

Further another embodiment of the present invention relates to a liquid crystal television. The liquid crystal television includes: a liquid crystal panel; and a plurality of light emitting apparatuses disposed on the back surface of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
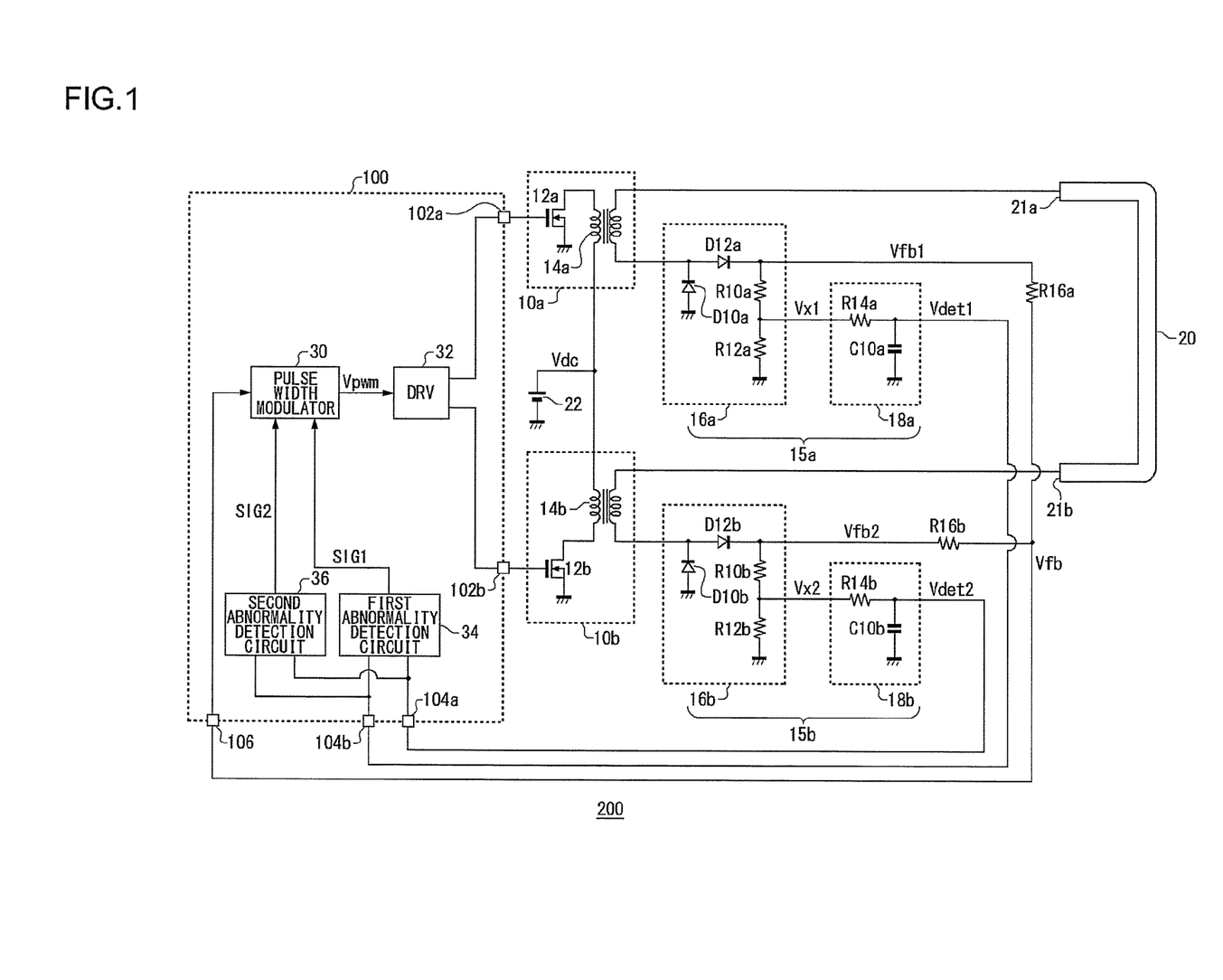
FIG. 1 is a circuit diagram showing the configuration of a light emitting apparatus as an embodiment of the invention.
Figure 2:
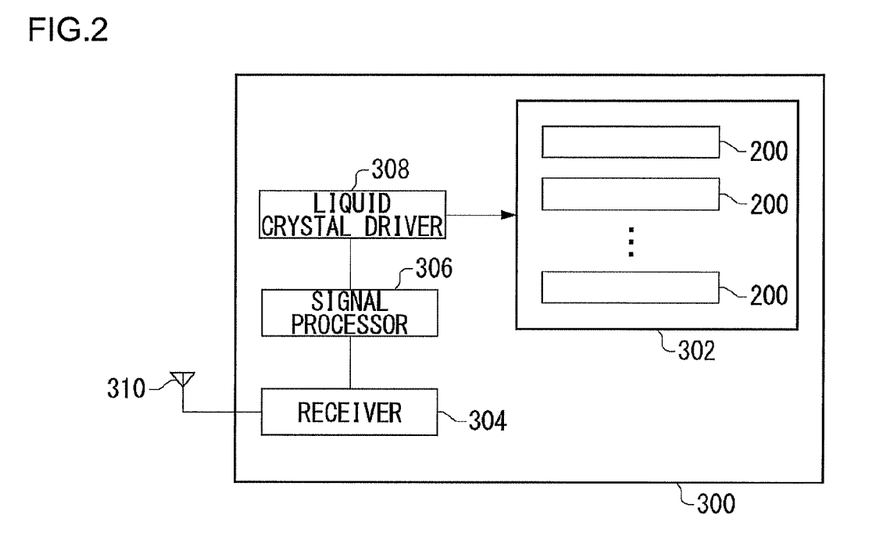
FIG. 2 is a block diagram showing the configuration of a liquid crystal television on which the light emitting apparatus of FIG. 1 is mounted.

FIG. 1 is a circuit diagram showing the configuration of a light emitting apparatus 200 as an embodiment of the present invention. FIG. 2 is a block diagram showing the configuration of a liquid crystal television 300 on which the light emitting apparatus 200 of FIG. 1 is mounted. The liquid crystal television 300 is connected to an antenna 310. The antenna 310 receives broadcast waves and outputs a received signal to a receiver 304. The receiver 304 detects and amplifies the received signal and outputs the signal to a signal processor 306. The signal processor 306 outputs image data obtained by demodulating modulated data to a liquid crystal driver 308. The liquid crystal driver 308 outputs the image data to a liquid crystal panel 302 on the scan line unit basis and displays a video image. On the back surface of the liquid crystal panel 302, a plurality of light emitting apparatuses 200 are disposed as a backlight. The light emitting apparatus 200 of the embodiment can be suitably used as the backlight of the liquid crystal panel 302. Referring again to FIG. 1, the configuration and operation of the light emitting apparatus 200 will be described in detail hereinbelow.

The light emitting apparatus 200 of the embodiment includes a CCFL 20 and an apparatus for driving the CCFL 20. The CCFL 20 is a U-shaped fluorescent lamp disposed in the back surface of the liquid crystal panel 302. Both ends of the CCFL 20 will be called a first end 21a and a second end 21b. The driving apparatus is a DC/AC converter for converting DC voltage Vdc output from a DC power supply 22 to AC voltage, boosting the AC voltage, and applying the voltage as a first AC voltage Vac1 and a second AC voltage Vac2 to the first and second ends 21a and 21b of the CCFL 20, respectively, to control light emission luminance.

The driving apparatus includes a control circuit 100, a first inverter 10a, a second inverter 10b, a first half-wave rectifier circuit 16a, a second half-wave rectifier circuit 16b, a first filter 18a, a second filter 18b, the DC power supply 22, and resistors R16a and R16b.

The first inverter 10a outputs the first AC voltage Vac1 to the first end 21a of the CCFL 20. Similarly, the second inverter 10b outputs the second AC voltage Vac2 having the reversed phase to the first AC voltage Vac1 to the second end 21b of the CCFL 20. The first and second inverters 10a and 10b are general DC/AC converters and have the same configuration, so that the first inverter 10a will be described. The first inverter 10a includes a first switching transistor 12a and a first transformer 14a. The DC voltage Vdc output from the DC power supply 22 is applied to one end of the primary coil of the first transformer 14a. The DC voltage Vdc is, for example, about 12V.

The first switching transistor 12a is an N-channel MOSFET (Metal Oxide Semiconductor Field Effect Transistor) whose source is grounded and whose drain is connected to the primary coil of the first transformer 14a. The gate of the first switching transistor 12a is connected to the first output terminal 102a, and a first switching signal Vsw1 output from the control circuit 100 is input.

The first switching transistor 12a is repetitively turned on and off in response to the first switching signal Vsw1, thereby accumulating energy in the first transformer 14a. The first AC voltage Vac1 obtained by the DC/AC conversion is output to the secondary coil. The first AC voltage Vac1 is a high voltage of 1000V or higher.

Similarly, the second switching transistor 12b is on/off controlled by the second switching signal Vsw2, and the second AC voltage Vac2 having the reversed phase to the first AC voltage Vac1 is generated.

A first current-voltage converting circuit 15a converts the secondary current of the first transformer 14a of the first inverter 10a to a voltage, and outputs the voltage as a first detection voltage Vdet1. Similarly, a second current-voltage converting circuit 15b converts the secondary current of the second transformer 14b of the second inverter 10b to a voltage, and outputs the voltage as a second detection voltage Vdet2. Since the first and second current-voltage converting circuits 15a and 15b have similar configurations, the configuration of the first current-voltage converting circuit 15a will be described here.

The first current-voltage converting circuit 15a includes the first half-wave rectifier circuit 16a and the first filter 18a. The first half-wave rectifier circuit 16a includes diodes D10a and D12a and resistors R10a and R12a. The secondary current of the first transformer 14a is rectified by the diodes D10a and D12a. Since the rectified current flows in the resistors R10a and R12a, a voltage drop occurs. The voltage drop across the resistors R10a and R12a is output as a first feedback voltage Vfb1. A voltage drop Vx1 across the resistor R12a is output to the first filter 18a.

The first feedback voltage Vfb1 is fed back to a voltage feedback terminal 106 via the resistor R16a. Similarly, a second feedback voltage Vfb2 is output from the second half-wave rectifier circuit 16b and fed back to the voltage feedback terminal 106 via the resistor R16b. To the voltage feedback terminal 106, a voltage obtained by combining the first and second feedback voltages Vfb1 and Vfb2, that is, average voltage is fed back as feedback voltage Vfb. The feedback voltage Vfb is input to a pulse width modulator 30. The pulse width modulator 30 outputs a pulse width modulation signal (hereinbelow, called PWM signal Vpwm) whose duty ratio is adjusted so that the feedback voltage Vfb becomes close to a predetermined reference voltage Vref. The driver circuit 32 alternately turns on/off the first and second switching transistors 12a and 12b on the basis of the PWM signal Vpwm. The reference voltage Vref is determined according to the light emission luminance of the CCFL 20.

Figure 3:
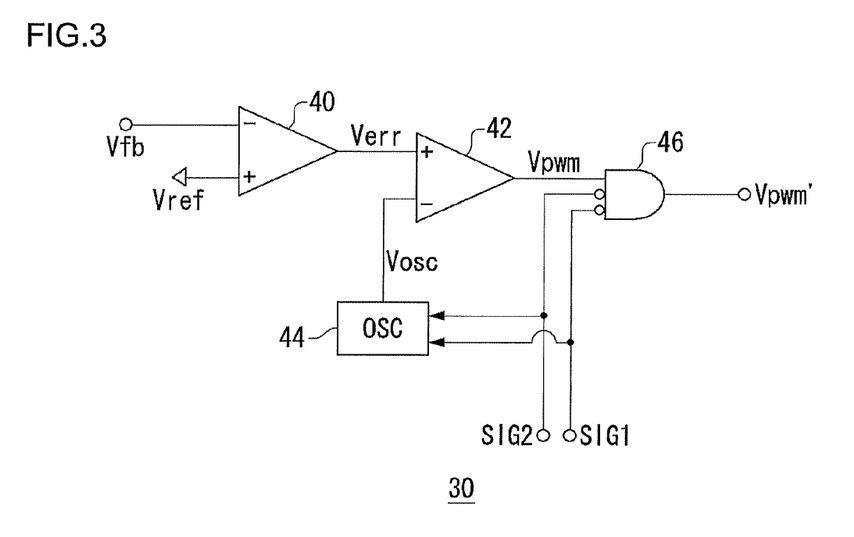
FIG. 3 is a circuit diagram showing a configuration example of a pulse width modulator in FIG. 1.

FIG. 3 is a circuit diagram showing a configuration example of the pulse width modulator 30. The pulse width modulator 30 includes an error amplifier 40, a PWM comparator 42, an oscillator 44, and an AND gate 46. The feedback voltage Vfb is input to the inversion input terminal of the error amplifier 40, and the reference voltage Vref is input to the non-inversion input terminal. The error amplifier 40 amplifies the error between the feedback voltage Vfb and the reference voltage Vref and outputs the amplified voltage to the PWM comparator 42. The PWM comparator 42 compares an error voltage Verr output from the error amplifier 40 and an oscillation period voltage Vosc output from the oscillator 44, and outputs the PWM signal Vpwm which is at the high or low level. Since the feedback voltage Vfb changes according to the current flowing in the CCFL 20, by controlling the pulse width of the PWM signal Vpwm so that the feedback voltage Vfb becomes close to the predetermined reference voltage Vref, the light emission luminance of the CCFL 20 can be adjusted to a desired value.

The AND gate 46 outputs the AND of the PWM signal Vpwm output from the PWM comparator 42, a first abnormality detection signal SIG1 output from a first abnormality detection circuit 34 which will be described later and a second abnormality detection signal SIG2 output from a second abnormality detection circuit 36. When an abnormality occurs in the circuit, the first abnormality detection signals SIG1 and SIG2 become the high level. When at least one of the first abnormality detection signals SIG1 and SIG2 is at the high level, an output Vpwm' of the AND gate 46 is fixed to the low level, and the switching operations of the first and second switching transistors 12a and 12b stop.

The oscillation frequency of the oscillator 44 is configured to be switched between drive frequency f1 and start frequency f2 higher than the drive frequency f1. Since the impedance of the CCFL 20 changes between a light emission state and a non-light-emission state, if the first and second inverters 10a and 10b are driven at the same frequency in the two states, the efficiency deteriorates. Consequently, the oscillator 44 is controlled so as to oscillate at a high frequency in the non-light-emission state and oscillate at a low frequency in the light emission state. To the oscillator 44, the first and second abnormality detection signals SIG1 and SIG2 are input. In the case where at least one of the signals becomes the high level, the oscillation frequency is set to the start frequency f2. In the other cases, the oscillation frequency is set to the drive frequency f1.

Referring again to FIG. 1, the first filter 18a is a first order low-pass filter including a resistor R14a and a capacitor C10a. The first filter 18a eliminates a high-frequency component in a voltage Vx1 corresponding to the secondary current of the first transformer 14a output from the first half-wave rectifier circuit 16a to smooth the voltage, and outputs the resultant voltage as the first detection voltage Vdet1. The first detection voltage Vdet1 is a voltage proportional to the first feedback voltage Vfb1.

The first detection voltage Vdet1 is input to a first detection voltage terminal 104a of the control circuit 100. Similarly, the second detection voltage Vdet2 output from the second current-voltage converting circuit 15b is input to the second detection voltage terminal 104b. The first and second detection voltages Vdet1 and Vdet2 are input to the first and second abnormality detection circuits 34 and 36, respectively. The first and second abnormality detection circuits 34 and 36 are provided to detect a circuit abnormality such as open circuit or short circuit of the CCFL 20. When an abnormality is detected, the first and second abnormality detection signals SIG1 and SIG2 becomes the high level.

Figure 4:
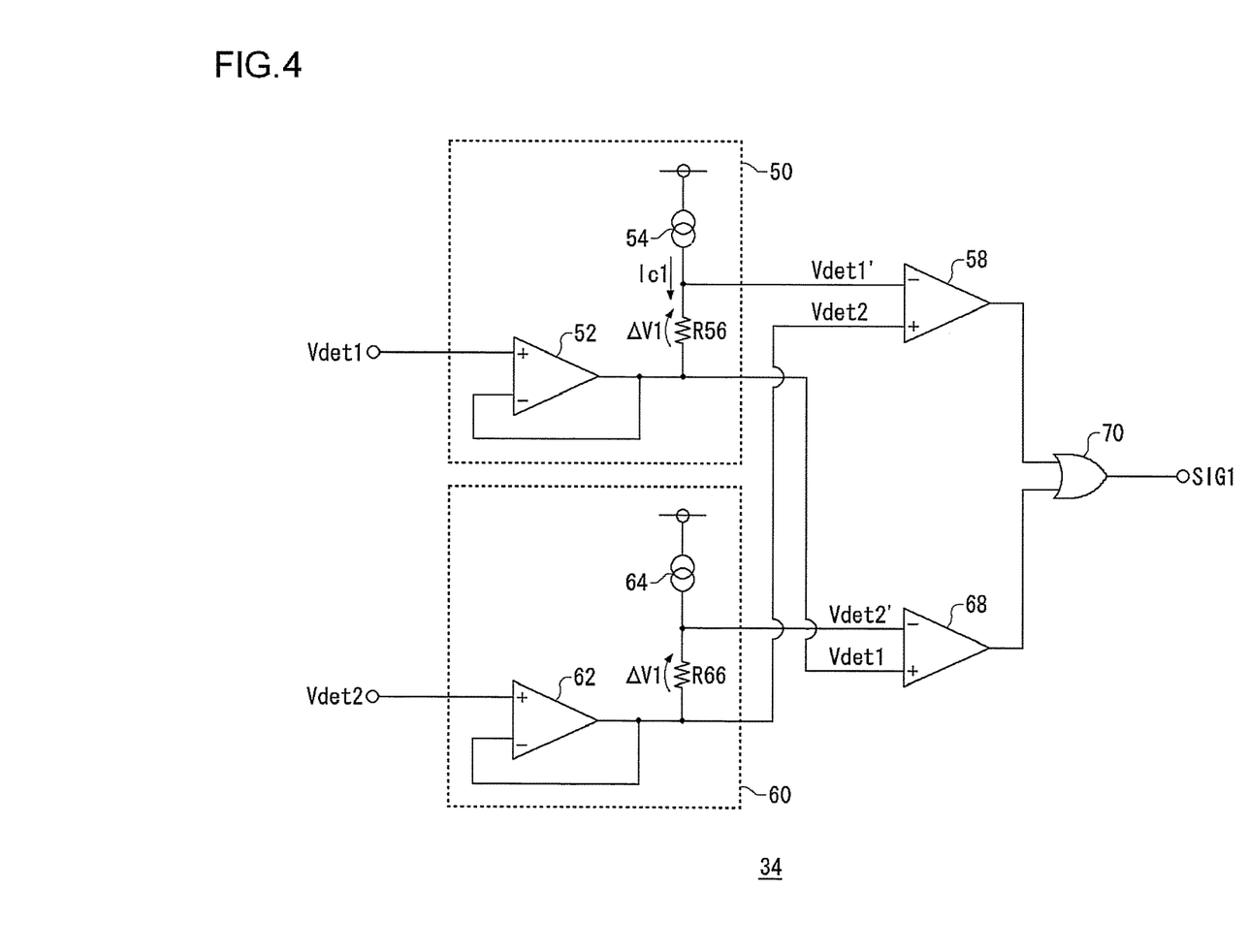
FIG. 4 is a circuit diagram showing the configuration of a first abnormality detection circuit in FIG. 1.

When the potential difference between the first and second detection voltages Vdet1 and Vdet2 exceeds the predetermined threshold voltage Vth1, the first abnormality detection circuit 34 determines that the circuit is abnormal. FIG. 4 is a circuit diagram showing the configuration of the first abnormality detection circuit 34. The first abnormality detection circuit 34 includes a first level shift circuit 50, a first comparator 58, a second level shift circuit 60, a second comparator 68, and an OR gate 70. The first level shift circuit 50 outputs a voltage Vdet1' obtained by shifting the level of the first detection voltage Vdet1 to the high potential side by the first threshold voltage Vth1. The second level shift circuit 60 outputs a voltage Vdet2' obtained by shifting the level of the second detection voltage Vdet2 to the high potential side by the first threshold voltage Vth1.

The first level shift circuit 50 includes a voltage follower circuit 52, a constant current source 54, and a resistor R56. The voltage follower circuit 52 is constructed by using an operational amplifier whose output terminal is connected to an inversion input terminal, and outputs the first detection voltage Vdet1 as it is, which is input to the non-inversion input terminal. One end of the resistor R56 is connected to the output terminal of the voltage follower circuit 52. The constant current source 54 is connected to the other end of the resistor R56 and passes a predetermined constant current Ic1. Since a voltage drop ΔV1 given by the product of the resistance value of the resistor R56 and the constant current Ic1 occurs in the resistor R56, a voltage obtained by shifting the level of the first detection voltage Vdet1 by ΔV1=R56×Ic1 is output from the connection point of the resistor R56 and the constant current source 54. In the embodiment, the resistance value and the constant current value are set so that the relation of ΔV1=Vth1 is satisfied. The second level shift circuit 60 has a configuration similar to that of the first level shift circuit 50, and includes a voltage follower circuit 62, a constant current source 64, and a resistor 66.

The first comparator 58 compares the second detection voltage Vdet2 with the output voltage Vdet1' of the first level shift circuit 50. The second comparator 68 compares the first detection voltage Vdet1 with the output voltage Vdet2' of the second level shift circuit 60. The OR gate 70 outputs the OR of output signals of the first and second comparators 58 and 68 as the first abnormality detection signal SIG1.

Figure 5:
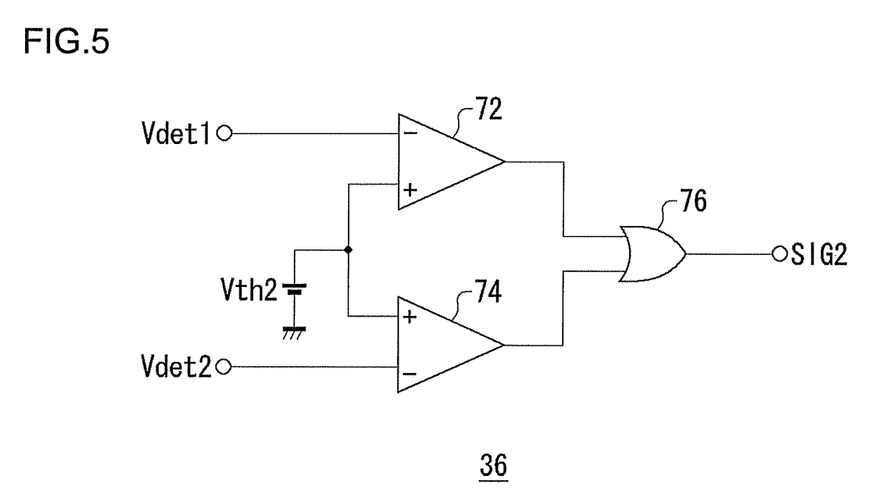
FIG. 5 is a circuit diagram showing the configuration of a second abnormality detection circuit in FIG. 1.

FIG. 5 is a circuit diagram showing the configuration of the second abnormality detection circuit 36. The second abnormality detection circuit 36 includes a third comparator 72 for comparing the first detection voltage Vdet1 with the second threshold voltage Vth2, a fourth comparator 74 for comparing the second detection voltage Vdet2 with the second threshold voltage Vth2, and an OR gate 76 for outputting the OR of the output signals of the third and fourth comparators 72 and 74. The second abnormality detection circuit 36 determines that the circuit is abnormal when at least one of the first and second detection voltages Vdet1 and Vdet2 is lower than the predetermined second threshold voltage Vth2, and outputs the high-level second abnormality detection signal SIG2.

The operation of the light emitting apparatus 200 constructed as described above will be described.

When a failure occurs in the CCFL 20 or the contact between the first and second ends 21a and 21b becomes poor, no light is emitted in the half on the first end 21a side and/or the half on the second end 21b side of the U-shaped CCFL 20. The control circuit 100 detects such an abnormal state of the circuit by monitoring the first and second detection voltages Vdet1 and Vdet2.

Figure 6:
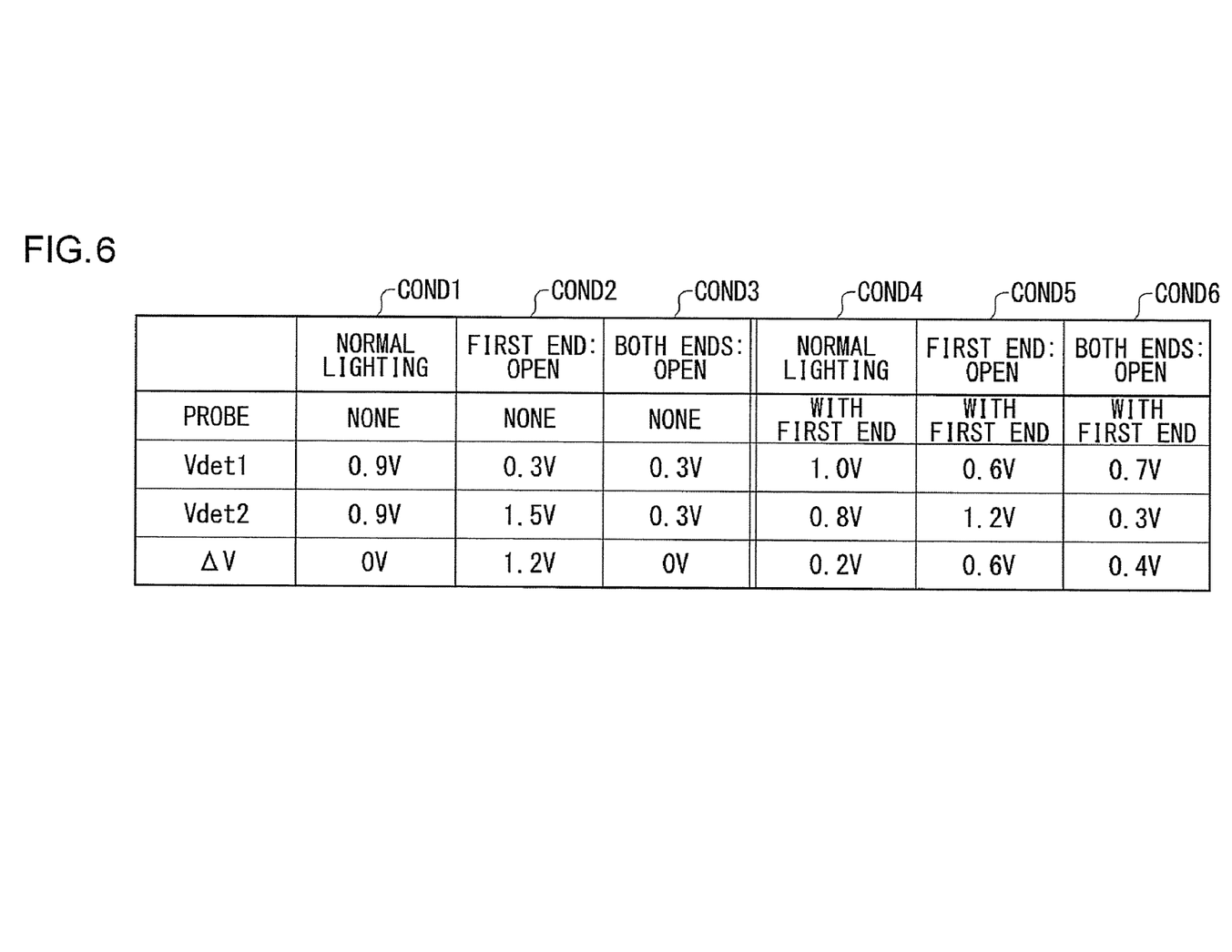
FIG. 6 is a diagram showing values of first and second detection voltages in a light emission state of the light emitting apparatus.

FIG. 6 shows an example of the first and second detection voltages Vdet1 and Vdet2 in the light emission state of the light emitting apparatus 200. Under conditions COND1, there is no circuit abnormality in the light emitting apparatus 200 and the CCFL 20 normally lights up. When the CCFL 200 normally lights up, the control circuit 100 receives feedback so that the feedback voltage Vfb as average voltage of the first feedback voltage Vfb1 on the first end 21a side and the second feedback voltage Vfb2 on the second end 21b side becomes equal to the predetermined reference voltage Vref. Thus, the first and second feedback voltages Vfb1 and Vfb2 become equal to a predetermined voltage value. In the embodiment, the predetermined voltage value is 0.9V.

When the first threshold voltage Vth1 set in the first abnormality detection circuit 34 is 0.7V and the second threshold voltage Vth2 set in the second abnormality detection circuit 36 is 0.45V, under the conditions COND1, ΔV is smaller than Vth1 (ΔV<Vth1). Consequently, the first abnormality detection signal SIG1 output from the first abnormality detection circuit 34 is at the low level. Since Vdet1 is larger than Vth2 (Vdet1>Vth2) and Vdet2 is larger than Vth2 (Vdet2>Vth2), the second abnormality detection signal SIG2 output from the second abnormality detection circuit 36 is also at the low level, and the light emission of the CCFL 20 continues.

As shown in conditions COND2, when the first end 21a side becomes open, the current flowing in the first end 21a side of the CCFL 20, that is, the secondary current of the first transformer 14a decreases, so that the first detection voltage Vdet1 drops to 0.3V. At this time, the first feedback voltage Vfb1 also similarly drops. The pulse width modulator 30 performs feedback so that the average value of the first and second feedback voltages Vfb1 and Vfb2 becomes close to the reference voltage Vref. Consequently, the second feedback voltage Vfb2 rises and, accompanying the rise, the second detection voltage Vdet2 also rises. Since the first feedback voltage Vfb1 is proportional to the first detection voltage Vdet1 and the second feedback voltage Vfb2 is proportional to the second detection voltage Vdet2, when the average values of the first and second feedback voltages Vfb1 and Vfb2 are equal to each other, the average values of the first and second detection voltages Vdet1 and Vdet2 are also equal to each other. As a result, the second detection voltage Vdet2 under the conditions COND2 is 1.5V.

Under the conditions COND2, ΔV is larger than Vth1 (ΔV>Vth1). Consequently, a circuit abnormality is detected by the first abnormality detection circuit 34, and the first abnormality detection signal SIG1 becomes the high level. Since Vdet is smaller than Vth2 (Vdet<Vth2), a circuit abnormality is detected also by the second abnormality detection circuit 36, and the second abnormality detection signal SIG2 becomes the high level. As a result, the PWM signal Vpwm' output from the pulse width modulator 30 is fixed to the low level, the switching operation of the first and second inverters 10a and 10b is stopped, and circuit protection is executed. The oscillation frequency of the oscillator 44 is set to start frequency f2.

When both of the first and second ends 21a and 21b are open as shown in the conditions COND3, both of the current flowing in the first end 21a side of the CCFL 20 and that flowing in the second end 21b side decrease, so that each of the first and second detection voltages Vdet1 and Vdet2 drops to about 0.3V. Therefore, the relations of Vdet1<Vth2 and Vdet2<Vth2 are satisfied under the conditions COND3, and the second abnormality detection signal SIG2 becomes the high level. In this case as well, the switching operation of the first and second inverters 10a and 10b is stopped like under the conditions COND2, and the frequency of the oscillator 44 is set to the start frequency f2.

Next, the circuit operation performed at the time of measuring, by using a high-voltage probe, the first and second AC voltages Vac1 and Vac2 applied to the first and second ends 21a and 21b during light emission of the light emitting apparatus 200 in a process of testing the liquid crystal television 300 and the like will be described. The conditions COND4 to COND6 correspond to the conditions COND1 to COND3, respectively, except for the point that a high-voltage probe is in contact with the first end 21a.

Under the conditions COND4, the CCFL 20 normally lights up like under the conditions COND1. When the high-voltage probe is allowed to come into contact with the first end 21a (or the second end 21b) in order to measure the first AC voltage Vac1 in this state, the first feedback voltage Vfb1 rises due to parasitic capacitance of the high-voltage probe, and the first detection voltage Vdet1 becomes about 1V higher than the set value of 0.9V. At this time, feedback is given in the direction of decreasing the second feedback voltage Vfb2 and the second detection voltage vdet2, and the second detection voltage Vdet2 becomes 0.8V.

Under the conditions COND4, ΔV is smaller than Vth1 (ΔV<Vth1) like under the conditions COND1. Consequently, the first abnormality detection signal SIG1 output from the first abnormality detection circuit 34 becomes the low level. Since the relations of Vdet1>Vth2 and Vdet2>Vth2 are satisfied, the second abnormality detection signal SIG2 output from the second abnormality detection circuit 36 is also at the low level, so that light emission of the CCFL 20 is continued.

Like the conditions COND2, the conditions COND5 correspond to the case where the first end 21a side is open. In this case, the current flowing in the first end 21a side of the CCFL 20, that is, the secondary current of the first transformer 14a decreases, so that the first detection voltage Vdet1 decreases from 0.9V which is in the normal lighting state. Under the conditions COND5, the high-voltage probe is in contact with the first end 21a. Consequently, the first detection voltage Vdet1 has a value of about 0.6V higher than 0.3V under the conditions COND2. At this time, the second detection voltage Vdet2 becomes higher than 0.9V in the normal lighting state by the feedback of the pulse width modulator 30 and becomes about 1.2V.

Under the conditions COND5, each of the first and second detection voltages Vdet1 and Vdet2 is higher than the second threshold voltage Vth2, so that a circuit abnormality cannot be detected by the second abnormality detection circuit 36. However, the potential difference ΔV between the first and second detection voltages Vdet1 and Vdet2 becomes 0.6V, so that the relation ΔV>Vth1 is satisfied, and a circuit abnormality can be detected by the first abnormality detection circuit 34.

The conditions COND6 are similar to the conditions COND3 and relate to the case where the first and second ends 21a and 21b of the CCFL 20 are open and the high-voltage probe is in contact with the first end 21a. When both of the first and second ends 21a and 21b become open, the second detection voltage Vdet2 decreases from 0.9V in the normal lighting state to about 0.3V. On the other hand, the first detection voltage Vdet1 does not decrease to 0.3V but decreases to about 0.7V for the reason that the parasitic capacitance of the high-voltage probe is connected to the first end 21a. In this case, the potential difference ΔV between the first and second detection voltages Vdet1 and Vdet2 is 0.4V, so that the circuit abnormality is not detected by the first abnormality detection circuit 34. However, Vdet2 becomes smaller than Vth2 (Vdet2<Vth2), so that a circuit abnormality can be detected by the second abnormality detection circuit 36.

As described above, in the light emitting apparatus 200 of the embodiment, when the CCFL 20 normally lights up as under the conditions COND1 and COND4, light emission is continued without detecting a circuit abnormality. As under the conditions COND2, COND3, and COND6, when the first end 21a and/or the second end 21b of the CCFL 20 are/is open, a circuit abnormality can be detected by the second abnormality detection circuit 36. In the case where only one of the first and second ends 21a and 21b of the CCFL 20 becomes open like under the conditions COND5 and the high-voltage probe is in contact with the terminal on the open side, a circuit abnormality cannot be detected by the second abnormality detection circuit 36. However, by monitoring the potential difference between the first and second detection voltages Vdet1 and Vdet2 by the first abnormality detection circuit 34, a circuit abnormality can be detected also at the time of a test using a high-voltage probe and the like.

The first and second threshold voltages Vth1 and Vth2 set by the first and second abnormality detection circuits 34 and 36 may be set so that first and second detection voltages Vdet1 and Vdet2 are actually measured under each of the conditions COND1 to COND6 and, on the basis of the actual measurement values, a circuit abnormality can be detected.

The embodiments are illustrative. It is to be understood by a person skilled in the art that various modifications are possible in combinations of the components and processes, and that the modifications are also in the scope of the present invention.

In the embodiments, all of the parts of the control circuit 100 may be integrated or a part of the components may be discrete parts or chip parts. The control circuit 100 may be also integrated by including the first and second switching transistors 12a and 12b. The parts to be integrated and the degree of integration may be determined according to the specifications, cost, occupation area, and the like of the light emitting apparatus 200.

The setting of the logic values of the high level and the low level of the loci circuit in the embodiment is an example. The logic values can be freely changed by properly inverting the values by an inverter or the like.

While the preferred embodiments of the present invention have been described using specific terms, such description is for illustrative purposes only, and it is to be understood that changes and variations may be made without departing from the spirit or scope of the appended claims.

What is claimed is:

1. A fluorescent lamp driving apparatus comprising:
   a first inverter which outputs a first alternating current (AC) voltage to one end of the fluorescent lamp;
   a second inverter which outputs a second AC voltage having a reversed phase to the first AC voltage to the other end of the fluorescent lamp;
   a first current-voltage converting circuit which converts a secondary current of a transformer in the first inverter to a voltage and outputs the voltage as a first detection voltage;
   a second current-voltage converting circuit which converts a secondary current of a transformer in the second inverter to a voltage and outputs the voltage as a second detection voltage; and
   a first abnormality detection circuit which determines a circuit abnormality when the potential difference between the first and second detection voltages exceeds a predetermined first threshold voltage, wherein
   the first abnormality detection circuit includes:
   a first level shift circuit which shifts level of the first detection voltage by the first threshold voltage;
   a second level shift circuit which shifts level of the second detection voltage by the first threshold voltage;
   a first comparator which compares the second detection voltage with output voltage of the first level shift circuit;
   a second comparator which compares the first detection voltage with output voltage of the second level shift circuit; and
   an OR gate which outputs OR of outputs of the first and second comparators, and
   the first abnormality detection circuit determines a circuit abnormality on the basis of the output of the OR gate.

2. The driving apparatus according to claim 1, wherein each of the first and second level shift circuits includes:
   a voltage follower circuit to which the first detection voltage or the second detection voltage is input;
   a resistor whose one end is connected to an output terminal of the voltage follower circuit; and
   a constant current source which passes constant current to the resistor, and
   each of the first and second level shift circuits outputs the level-shifted voltage from a connection point between the resistor and the constant current source.

3. The driving apparatus according to claim 1, wherein
each of the first and second current-voltage converting circuits includes:
a half-wave rectifier circuit which rectifies the secondary current of the transformer; and
a filter which smoothes an output of the half-wave rectifier circuit, and
each of the first and second current-voltage converting circuits outputs an output voltage of the filter as the first or second detection voltage to respective one of the first and second the comparators.

4. The driving apparatus according to claim 1, further comprising a second abnormality detection circuit which determines a circuit abnormality when at least one of the first and second detection voltages is lower than a predetermined second threshold voltage.

5. The driving apparatus according to claim 4, wherein the second abnormality detection circuit comprises:
a third comparator which compares the first detection voltage with the second threshold voltage;
a fourth comparator which compares the second detection voltage with the second threshold voltage; and
an OR gate which outputs OR of outputs of the third and fourth comparators.

6. The driving apparatus according to claim 1, wherein the fluorescent lamp is a cold-cathode fluorescent lamp.

7. A light emitting apparatus comprising:
a driving apparatus according to claim 1; and
a U-shaped fluorescent lamp across which the first and second AC voltages output from the first and second inverters of the driving apparatus are applied.

8. A liquid crystal display apparatus comprising:
a liquid crystal panel; and
a plurality of light emitting apparatuses according to claim 7 disposed on the back surface of the liquid crystal panel.

9. A fluorescent lamp driving apparatus comprising:
a first inverter which outputs a first alternating current (AC) voltage to one end of the fluorescent lamp;
a second inverter which outputs a second AC voltage having a reversed phase to the first AC voltage to the other end of the fluorescent lamp;
a first current-voltage converting circuit which converts a secondary current of a transformer in the first inverter to a voltage and outputs the voltage as a first detection voltage;
a second current-voltage converting circuit which converts a secondary current of a transformer in the second inverter to a voltage and outputs the voltage as a second detection voltage; and
a first abnormality detection circuit which determines a circuit abnormality when the potential difference between the first and second detection voltages exceeds a predetermined first threshold voltage, wherein
each of the first and second current-voltage converting circuits includes:
a half-wave rectifier circuit which rectifies the secondary current of the transformer; and
a filter which smoothes an output of the half-wave rectifier circuit, and
each of the first and second current-voltage converting circuits outputs an output voltage of the filter as the first or second detection voltage to a comparator.

10. The driving apparatus according to claim 9, wherein the first abnormality detection circuit includes:
a first level shift circuit which shifts level of the first detection voltage by the first threshold voltage;
a second level shift circuit which shifts level of the second detection voltage by the first threshold voltage;
a first comparator which compares the second detection voltage with output voltage of the first level shift circuit;
a second comparator which compares the first detection voltage with output voltage of the second level shift circuit; and
an OR gate which outputs OR of outputs of the first and second comparators, and
the first abnormality detection circuit determines a circuit abnormality on the basis of the output of the OR gate.

11. The driving apparatus according to claim 10, wherein each of the first and second level shift circuits includes:
a voltage follower circuit to which the first detection voltage or the second detection voltage is input;
a resistor whose one end is connected to an output terminal of the voltage follower circuit; and
a constant current source which passes constant current to the resistor, and
each of the first and second level shift circuits outputs the level-shifted voltage from a connection point between the resistor and the constant current source.

12. The driving apparatus according to claim 9, further comprising a second abnormality detection circuit which determines a circuit abnormality when at least one of the first and second detection voltages is lower than a predetermined second threshold voltage.

13. The driving apparatus according to claim 12, wherein the second abnormality detection circuit comprises:
a third comparator which compares the first detection voltage with the second threshold voltage;
a fourth comparator which compares the second detection voltage with the second threshold voltage; and
an OR gate which outputs OR of outputs of the third and fourth comparators.

14. The driving apparatus according to claim 9, wherein the fluorescent lamp is a cold-cathode fluorescent lamp.

15. A light emitting apparatus comprising:
a driving apparatus according to claim 9; and
a U-shaped fluorescent lamp across which the first and second AC voltages output from the first and second inverters of the driving apparatus are applied.

16. A liquid crystal display apparatus comprising:
a liquid crystal panel; and
a plurality of light emitting apparatuses according to claim 15 disposed on the back surface of the liquid crystal panel.

17. A fluorescent lamp driving apparatus comprising:
a first inverter which outputs a first alternating current (AC) voltage to one end of the fluorescent lamp;
a second inverter which outputs a second AC voltage having a reversed phase to the first AC voltage to the other end of the fluorescent lamp;
a first current-voltage converting circuit which converts a secondary current of a transformer in the first inverter to a voltage and outputs the voltage as a first detection voltage;
a second current-voltage converting circuit which converts a secondary current of a transformer in the second inverter to a voltage and outputs the voltage as a second detection voltage; and
a first abnormality detection circuit which determines a circuit abnormality when the potential difference between the first and second detection voltages exceeds a predetermined first threshold voltage, wherein the driving apparatus further comprises
a second abnormality detection circuit which determines a circuit abnormality when at least one of the first and second detection voltages is lower than a predetermined second threshold voltage.

18. The driving apparatus according to claim 17, wherein the first abnormality detection circuit includes:
a first level shift circuit which shifts level of the first detection voltage by the first threshold voltage;
a second level shift circuit which shifts level of the second detection voltage by the first threshold voltage;
a first comparator which compares the second detection voltage with output voltage of the first level shift circuit;
a second comparator which compares the first detection voltage with output voltage of the second level shift circuit; and
an OR gate which outputs OR of outputs of the first and second comparators, and
the first abnormality detection circuit determines a circuit abnormality on the basis of the output of the OR gate.

19. The driving apparatus according to claim 18, wherein each of the first and second level shift circuits includes:
a voltage follower circuit to which the first detection voltage or the second detection voltage is input;
a resistor whose one end is connected to an output terminal of the voltage follower circuit; and
a constant current source which passes constant current to the resistor, and
each of the first and second level shift circuits outputs the level-shifted voltage from a connection point between the resistor and the constant current source.

20. The driving apparatus according to claim 17, wherein each of the first and second current-voltage converting circuits includes:
a half-wave rectifier circuit which rectifies the secondary current of the transformer; and
a filter which smoothes an output of the half-wave rectifier circuit, and
each of the first and second current-voltage converting circuits outputs an output voltage of the filter as the first or second detection voltage to a comparator.

21. The driving apparatus according to claim 20, wherein the second abnormality detection circuit comprises:
a third comparator which compares the first detection voltage with the second threshold voltage;
a fourth comparator which compares the second detection voltage with the second threshold voltage; and
an OR gate which outputs OR of outputs of the third and fourth comparators.

22. The driving apparatus according to claim 17, wherein the fluorescent lamp is a cold-cathode fluorescent lamp.

23. A light emitting apparatus comprising:
a driving apparatus according to claim 17; and
a U-shaped fluorescent lamp across which the first and second AC voltages output from the first and second inverters of the driving apparatus are applied.

24. A liquid crystal display apparatus comprising:
a liquid crystal panel; and
a plurality of light emitting apparatuses according to claim 23 disposed on the back surface of the liquid crystal panel.

* * * * *